United States Patent
Jagoda (10) Patent No.: US 11,365,828 B2
(45) Date of Patent: Jun. 21, 2022

(54) SYSTEM AND METHOD FOR DETECTING POSITION OF A VALVE DRIVEN BY A SOLENOID LINEAR ACTUATOR

(71) Applicant: DANFOSS POWER SOLUTIONS II TECHNOLOGY A/S, Nordborg (DK)

(72) Inventor: Aaron Hertzel Jagoda, Bloomington, MN (US)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 0 days.

(21) Appl. No.: 16/460,554

(22) Filed: Jul. 2, 2019

(65) Prior Publication Data

US 2020/0011449 A1 Jan. 9, 2020

Related U.S. Application Data

(60) Provisional application No. 62/694,763, filed on Jul. 6, 2018.

(51) Int. Cl.
| | |
|---|---|
| *F16K 31/42* | (2006.01) |
| *F16K 17/36* | (2006.01) |
| *F16K 31/06* | (2006.01) |

(52) U.S. Cl.
CPC ............ *F16K 31/42* (2013.01); *F16K 17/36* (2013.01); *F16K 31/0651* (2013.01); *F16K 31/0668* (2013.01)

(58) Field of Classification Search
None
See application file for complete search history.

(56) References Cited

U.S. PATENT DOCUMENTS

| | | | |
|---|---|---|---|
| 3,671,814 A | 6/1972 | Dick | |
| 2004/0246649 A1 | 12/2004 | Besen | |
| 2009/0230336 A1* | 9/2009 | Laverdiere | G05D 7/0617 251/14 |
| 2011/0019162 A1* | 1/2011 | Huebner | G03B 21/145 353/79 |
| 2015/0279538 A1* | 10/2015 | Toda | H01F 7/081 475/31 |
| 2016/0018017 A1* | 1/2016 | Burlage | F16K 31/48 137/1 |
| 2017/0314580 A1* | 11/2017 | Steensma | F02M 59/466 |
| 2020/0132217 A1* | 4/2020 | Gismervik | G01D 18/008 |

FOREIGN PATENT DOCUMENTS

| | | |
|---|---|---|
| EP | 2 018 499 B1 | 11/2010 |
| JP | 2007-327606 A | 12/2007 |
| WO | 2007/134287 A1 | 11/2007 |
| WO | WO-2018193058 A1 * 10/2018 | ............ G01D 18/008 |

OTHER PUBLICATIONS

Translation of JP2007327606 (Year: 2020).*
Extended European Search Report for Application No. 19184279.8 dated Nov. 21, 2019.

* cited by examiner

*Primary Examiner* — Daphne M Barry
(74) *Attorney, Agent, or Firm* — Merchant & Gould P.C.

(57) ABSTRACT

A valve assembly includes a valve moveable between an open position where hydraulic fluid flow is permitted and a closed position where hydraulic fluid flow is blocked. A controller includes a magnetometer adapted to measure a magnetic flux through at least a portion of a solenoid linear actuator that moves the valve. A magnetic flux value measured by the magnetometer corresponds to a linear position of the regulating member relative to the port.

21 Claims, 6 Drawing Sheets

| Electrical Current Value ← 204 | Expected Magnetic Flux Value ← 202 |
|---|---|
| A1 — 210 | B1 — 208 |
| A2 — 210 | B2 — 208 |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |
| ... | ... |

SYSTEM AND METHOD FOR DETECTING POSITION OF A VALVE DRIVEN BY A SOLENOID LINEAR ACTUATOR

CROSS-REFERENCE TO RELATED APPLICATION

This application claims the benefit of U.S. Patent Application Ser. No. 62/694,763, filed on Jul. 6, 2018, the disclosure of which is incorporated herein by reference in its entirety.

BACKGROUND

Many mechanical systems, such as hydraulic systems, include valves to regulate fluid flow. In the case of hydraulic systems, valves are used to regulate flow of hydraulic fluid. Valves include a flow or pressure regulating member that moves relative to a port in a fluid flow passage to regulate fluid flow. Some hydraulic systems include spool or poppet style valves, where the regulating member is one or more lands of a spool or poppet that moves within a flow passage. In some systems, the regulating member is driven by a solenoid linear actuator. Knowing the position of the regulating member relative to its corresponding port or ports is important for controlling the overall system as desired and also for detecting mechanical problems or failures in the system. In typical hydraulic spool valve assemblies, spool position is detected using a linear variable differential transformer (LVDT) coupled directly to the spool. However, LVDT's are expensive and can be damaged over time by being subjected to the high pressure hydraulic fluid in the flow passage in which they are positioned.

SUMMARY

In general terms, the present disclosure is directed to systems and methods that provide for cost-effective and/or otherwise improved valve assemblies. More particularly, the systems and methods of the present disclosure provide for improvements in detecting the position of a valve's flow regulating member or pressure regulating member driven by a solenoid linear actuator. In some examples, the detected position of the regulating member can be used to diagnose a possible fault in the system that may require maintenance. In other examples, the detected position can be used as an indicator that electrical current to the solenoid must be increased or decreased to achieve the desired position of the flow control member or pressure control member. In some embodiments, the valve assemblies are hydraulic valve assemblies that regulate flow or pressure of hydraulic fluid. However, the principles of the present disclosure are not limited to hydraulic valves or to hydraulic systems; rather, the principles can be readily applied to any valve assembly and corresponding system in which the valve's flow or pressure control member is driven by a solenoid linear actuator or another type of electro-magnetically driven linear actuator. Non-limiting examples of hydraulic systems that can be adapted to include valve assemblies and controls according to the principles of the present disclosure include asphalt sprayers, backhoe loaders, wheel loaders, tractors, telehandlers, aerial work platforms, etc.

According to certain aspects of the present disclosure, a valve assembly comprises: a regulating member mounted within a bore of a valve housing, the regulating member being moveable between a plurality of open positions where fluid flow is permitted through a port of the valve housing and a closed position where fluid flow is blocked through the port, the valve assembly further comprising a solenoid linear actuator adapted to linearly drive the regulating member between the closed position and the plurality of open positions; the valve assembly further comprising a magnetometer, the magnetometer being adapted to measure a magnetic flux through at least a portion of the solenoid linear actuator; wherein a magnetic flux value measured by the magnetometer corresponds to a linear position of the regulating member relative to the port.

In some examples, the regulating member is one of, or both of, a flow regulating member or a pressure regulating member. In some examples, the valve assembly further comprises a current meter that measures electrical current in the solenoid linear actuator, wherein values of electrical current in the solenoid linear actuator measured by the current meter are mapped in a look-up table to expected magnetic flux values measured by the magnetometer. In some examples, the electrical current values are mapped to expected magnetic flux values and expected inductance values in the solenoid coil(s), or to expected magnetic flux-inductance pair values. In some examples, a look-up table is generated and stored in a memory, the look-up table mapping each of a plurality of electrical current values in the solenoid linear actuator to its corresponding expected magnetic flux value or magnetic flux-inductance pair value, where the magnetic flux value or magnetic-flux-inductance pair value corresponds to a unique linear position of the regulating member relative to the port. In some examples, during operation of the valve assembly, for a given measured current supplied to the solenoid, the magnetic flux or magnetic flux-inductance pair is measured and used as feedback that is compared to the stored expected magnetic flux value or the expected magnetic flux-inductance pair value corresponding to that current value to determine whether to perform a corrective action, the corrective action including adjusting the current in the solenoid until the magnetic flux or the magnetic-flux and inductance combination corresponding to the desired position of regulating member is achieved, and/or shutting off a system that includes the valve assembly. In some examples, the fluid that flows through the port when the regulating member is in one of the open positions is a liquid. In some examples, the fluid that flows through the port when the regulating member is in one of the open positions is a gas. In some examples, the regulating member is a spool. In some examples, the regulating member is a metering land of a spool. In some examples, the regulating member is a poppet of a poppet valve assembly. In some examples, the magnetometer is an integrated component of a control unit that controls metered flow through the port. In some examples, the magnetometer is adapted to measure a magnetic flux vector relative to each of three mutually perpendicular axes in space. In some examples, the control unit includes a printed circuit board to which are operatively coupled the magnetometer, a gyroscope, and an accelerometer. In some examples, the magnetometer is not positioned in a flow passage of the valve assembly or of a system that includes the valve assembly. In some examples, the control unit is not positioned in a flow passage of the valve assembly or of a system that includes the valve assembly. In some examples, the control unit includes, and/or is operatively coupled to, the memory and one or more processors adapted to execute computer readable instructions stored in the memory. In some examples, the control unit is operatively coupled to an operator interface, the operator interface adapted to receive commands to control the position of the regulating member. In some examples, the control unit corresponds to any of the control units and/or controllers described in U.S. Provisional Patent Application No. 62/692,173 filed Jun. 29, 2018, U.S. Provisional Patent Application No. 62/692,120 filed Jun. 29, 2018, U.S. Provisional Patent Application No. 62/692,072 filed Jun. 29, 2018, and/or U.S. Provisional Patent Application No. 62/691,975 filed Jun. 29, 2018, the contents of all of which applications are hereby fully incorporated by reference in their entireties.

According to further aspects of the present disclosure, a method of detecting a deviation from an expected position of a regulating member of a valve assembly in a mechanical system comprises: for a first electrical current value received by a solenoid of the valve assembly that drives linear movement of the regulating member, measuring, with a magnetometer, a first magnetic flux value through the solenoid; comparing the first magnetic flux value to a predetermined expected magnetic flux value corresponding to the first electrical current value; and, based on the comparing, determining if there is a deviation from the expected position of the regulating member.

In some examples, the method further comprises, for the first electrical current value received by the solenoid, measuring a first inductance value in the solenoid; and comparing the first inductance value to a predetermined expected inductance value corresponding to the first electrical current value, wherein the determining if there is a deviation is also based on the comparing the first inductance value to the predetermined expected inductance value. In some examples, the method further comprises adjusting the current received by the solenoid until the expected magnetic flux value is measured by the magnetometer. In some examples, the method further comprises adjusting the current received by the solenoid until the expected inductance value is measured. In some examples, the expected magnetic flux value is one of a plurality of expected magnetic flux values, and the first electrical current value is one of a plurality of electrical current values, wherein the method further comprises generating a look-up table that maps each of the electrical current values to one of the expected magnetic flux values. In some examples, the expected inductance value is one of a plurality of expected inductance values, wherein the generating a look-up table comprises mapping each of the electrical current values to one of the expected magnetic flux values and one of the expected inductance values. In some examples, the fluid is a liquid. In some examples, the fluid is a gas. In some examples, the regulating member is a metering land of a spool, or a poppet. In some examples, the magnetometer is an integrated component of a control unit that controls metered flow through the port. In some examples, the magnetometer is adapted to measure a magnetic flux vector relative to each of three mutually perpendicular axes in space.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

An operator controls the position of the flow or pressure regulating members of valves within a mechanical system by issuing various operating commands to the system (e.g., via a joystick or other command interface). When the valves deteriorate or wear out, the position of the flow or pressure regulating members of those valves can deviate from what would be expected from a given operating command, thereby resulting in, e.g., too much or too little flow, an undesirable pressure differential across the valve, etc. It is therefore beneficial to detect such deviations during operation of the system so that command inputs can be adjusted to achieve the desired flow/pressure, and also to prevent against system failure and consequences thereof, such as breakdown of the machinery/equipment.

Figure 1:
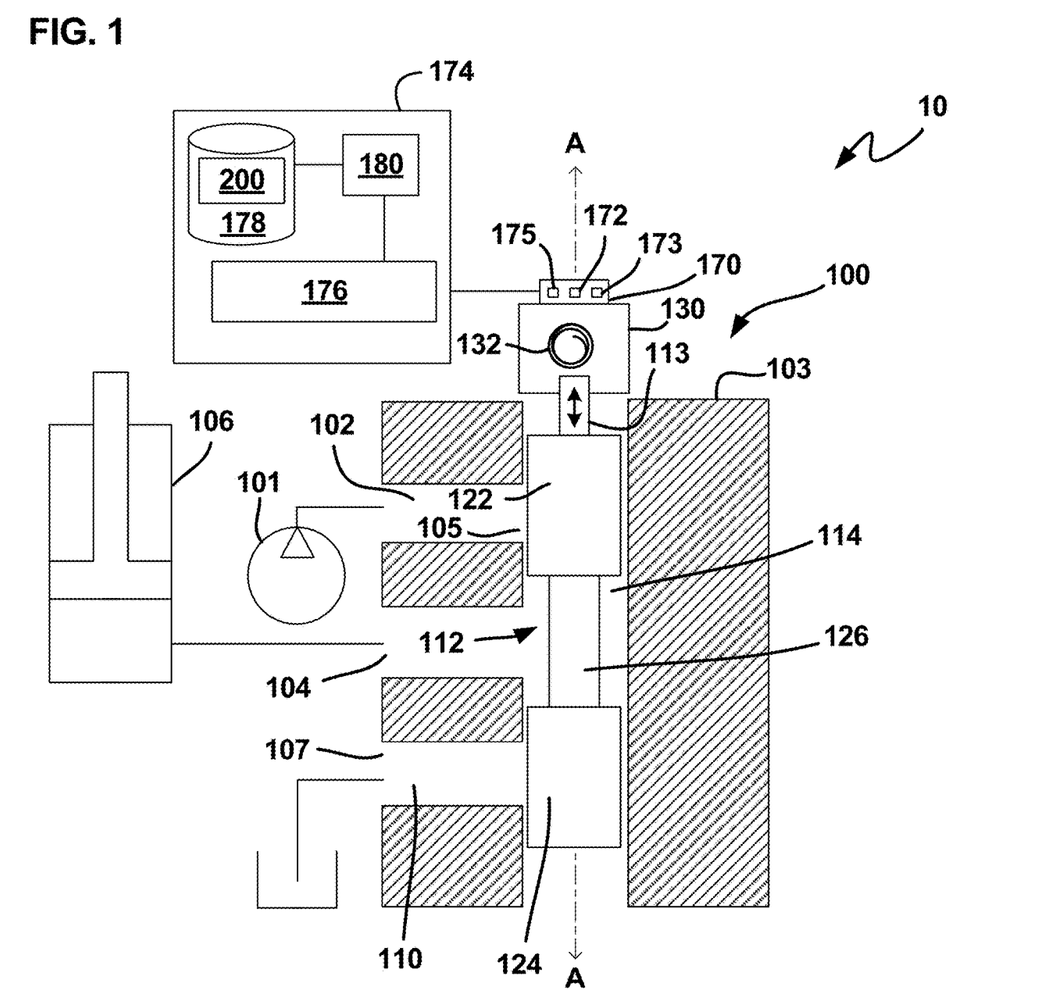
FIG. 1 is a schematic illustration of an example system including a valve assembly according to the present disclosure.

FIG. 1 represents a mechanical system 10 that at least partially operates through the use of hydraulics. The hydraulics include a non-limiting embodiment of a valve assembly 100 used to illustrate principles of the present disclosure. In some examples, the valve assembly is a flow metering valve. The valve assembly 100 includes a housing 103 housing a spool 112 mounted in a spool bore 114 defined by the housing 103. In this example, the spool valve is a three-way spool valve. However, the principles of the present disclosure are readily applied to other spool valves (e.g., two-way spool valves) and other flow control valves such as poppet valves. The spool 112 includes a shaft 126 coupled to a pair of metering lands 122 and 124 on either end of the shaft 126, each land being a regulating member (e.g., a fluid flow and/or fluid pressure regulating member) of the valve assembly 100. A solenoid linear actuator 130 (solenoid) is coupled to the spool 112 and is adapted to drive axial linear movement of the spool 112 within the bore 114, the linear movement being along the central axis A of the bore 114.

A fluid supply 101 (e.g., a pump) supplies hydraulic fluid via a supply line 102 through a supply port 105 to a work port 104. The work port 104 is connected to a hydraulic cylinder 106 that drives a load, e.g., a load of a piece of hydraulic equipment or machinery. Fluid from the work port 104 empties to the tank 108 via a tank port 107 and a tank line 110.

In certain examples the system 10 maintains a constant or controlled pressure differential across the valve. In other examples, a position of the spool 112 in combination with a sensed pressure differential can be used to estimate fluid flow rate through the ports.

A control unit 170 is operatively and fixedly mechanically coupled to the solenoid 130 and is configured to provide control signals that generate current in the solenoid 130 to drive axial linear movement of the regulating members 122 and 124 along the axis A. The control unit 170 is in a fixed position relative to the coil or coils 132 of the solenoid 130. The control unit 170 is positioned outside the bore 114 and any hydraulic flow passage, and so is not exposed to hydraulic pressure generated by the system 10.

The control unit 170 includes a PCB or other circuitry having a magnetometer 172 operatively coupled thereto. The PCB also includes control electronics and, optionally, an accelerometer and/or a gyroscope. Due to the fixed mechanical coupling of the solenoid 130 to the control unit 170, there is a fixed or substantially fixed distance between the magnetometer 172 and the coil or coils 132 of the solenoid 130. In some examples, the magnetometer 172 is adapted to measure a magnetic flux vector along three mutually perpendicular axes.

The control unit 170 also includes an electrical current meter 173, e.g., an ammeter, adapted to measure electrical current in the coil or coils 132 of the solenoid 130. An inductance sensor 175, which may be included in the control unit 170 or optionally positioned remotely from the control unit 170, is adapted to measure inductance in the coil or coils 132 of the solenoid 130. In certain implementations, inductance is sensed by applying a dither signal to the electrical current applied to the solenoid 130 and monitoring a range of change of the current. In an example, the dither signal is applied when the spool 112 is being held at a given position. In an example, a small amplitude square wave is applied over the steady state current value and the inductance is determined by looking at the rise or decay rate as the measured current approaches the commanded current.

Measurements from the electrical current meter 173, the inductance sensor 175, and the magnetometer 172, are fed to an operating subsystem 174 of the system 10, the operating subsystem 174 being operatively coupled to the control unit 170. The operating subsystem 174 includes one or more processors 180 adapted to execute computer readable instructions and to process signals received from the control unit 170. The operating subsystem 174 also includes a memory 178 and a command interface 176, both operatively coupled to the one or more processors 180. In addition to storing computer readable instructions, the memory 178 also stores a look-up table 200.

As the solenoid 130 receives electrical current to drive axial linear movement of the spool 112 relative to the supply port 105 along the axis A, a portion 113 of the spool 112 or a portion of a spool assembly that includes the spool 112 and is fixedly coupled to the spool 112 moves relative to the one or more coils 132 of the solenoid 130, causing the magnetic flux through the coil or coils 132 to change, which likewise generates an inductance in the coil or coils 132.

When initializing and calibrating the system 10, these different magnetic fluxes, which depend in part on the position of the spool 112 or spool assembly relative to the supply port 105, are measured as a three-dimensional vector by the magnetometer 172. These different magnetic fluxes also are mapped to the electrical current value read by the current meter 173, which corresponds to the amount of electrical current the solenoid 130 is charged with to cause the spool 112 to assume the position corresponding to the measured magnetic flux, providing for an index of expected magnetic flux values for different electrical currents received by the solenoid 130.

Once the look-up table 200 is populated with all of the expected magnetic flux values and corresponding electrical current values, the look-up table 200 can be used as a system operating baseline to check for deviations from the expected magnetic flux values when inputting an operating command corresponding to a given electrical current received by the solenoid 130. A deviation, or a deviation beyond a pre-defined tolerance, indicates that the spool 112 is not in the desired position, i.e., not in the position expected from the given operating command.

Figure 2:
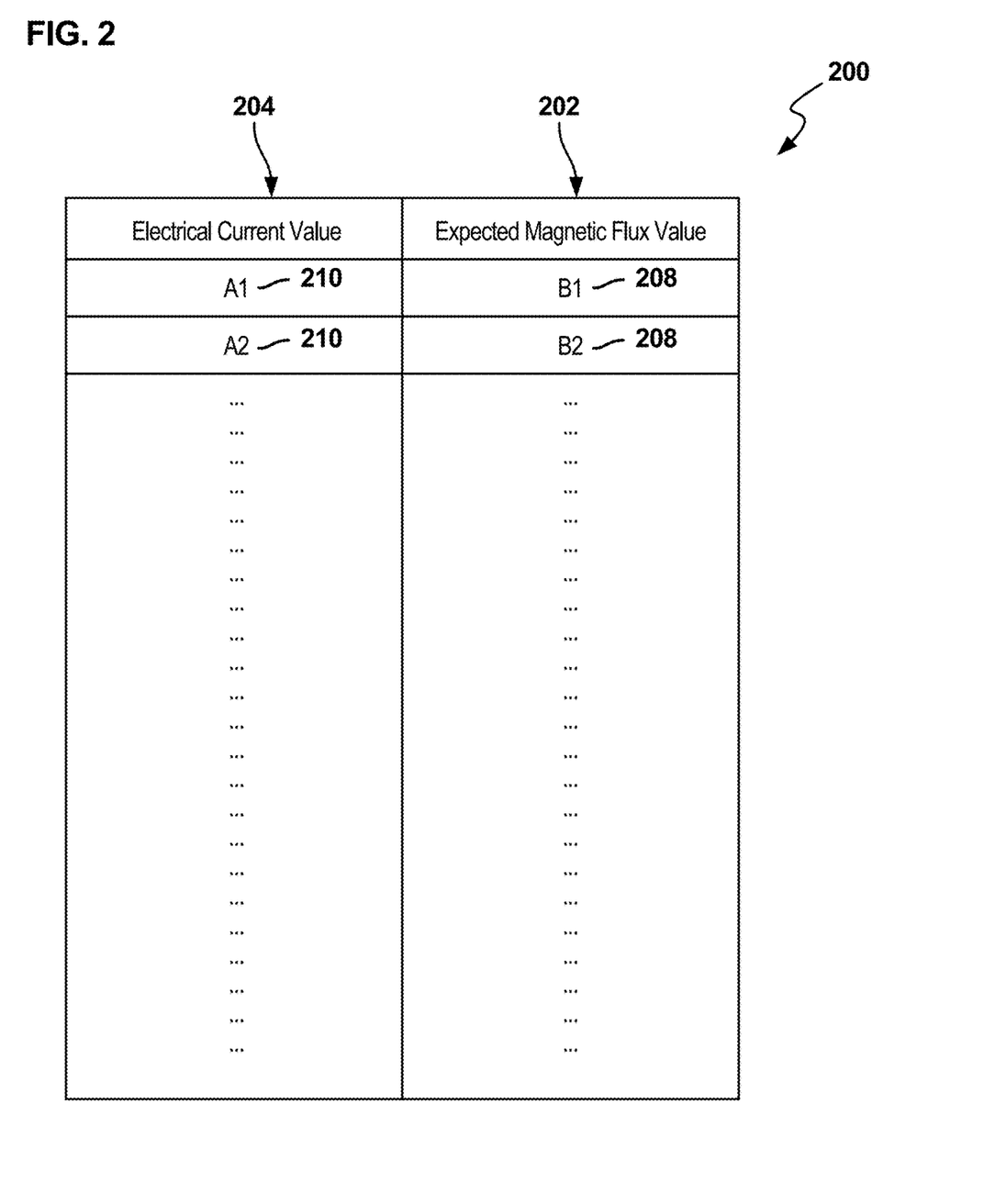
FIG. 2 is a schematic illustration of a look-up table used in the system of FIG. 1.

Referring to FIG. 2, the look-up table 200 includes an electrical current value column 204 with electrical current values 210 that are mapped to corresponding expected magnetic flux values 208 of an expected magnetic flux column 202. Each expected magnetic flux value 208 corresponds to the expected linear position of the regulating member 112 (FIG. 1) of the valve assembly relative to the supply port 105 (FIG. 1) when the solenoid 130 (FIG. 1) receives the corresponding electrical current value 210.

Referring to FIGS. 1-2, in certain examples, the look-up table 200 maps the electrical current values 210 not only to corresponding expected magnetic flux values 208, but also to corresponding expected inductance values, or expected magnetic flux-inductance pair values, where the inductance in the solenoid 130 is measured by the inductance sensor 175. The combined information provided by the inductance and the magnetic flux indicates the linear position of the spool 112 relative to the supply port 105. It should be appreciated that, in some examples, comparing both measured magnetic flux and measured inductance to expected magnetic flux and expected inductance, respectively, for a given electrical current received by the solenoid 130 can provide for greater precision in determining the linear position of the spool 112 relative to the supply port 105 than comparing measured magnetic flux to expected magnetic flux only.

Still referring to FIGS. 1-2, in an example operating sequence of the system 10, once the look-up table 200 has been fully populated, a command is input via the command interface 176 to drive the spool 112 to move linearly along the axis A via the solenoid 130. A signal corresponding to the command is processed by the processor 180 and output to the control unit 170, which charges the solenoid 130 with a known electrical current that corresponds to the command. The charged solenoid 130 causes the spool 112 to move along the axis A. Magnetic flux feedback from the magnetometer 172, or magnetic flux feedback from the magnetometer 172 and inductance feedback from the inductance sensor 175 are compared, using the processor 180, to the expected magnetic flux value or the expected magnetic flux and inductance values for the known electrical current provided in the look-up table 200. The processor 180 thereby determines if the position of the spool 112 deviates from the desired position corresponding to the input command. If the sensed and expected values match or match within a predefined tolerance, then no deviation between the expected position of the spool 112 and the measured position of the spool 112 is detected. If the sensed and expected values do not match or do not match within a predefined tolerance, then a deviation between the expected position and the measured position is detected and, optionally, one or more corrective actions occur. Such corrective actions include, e.g., automatically adjusting, or prompting an operator via the interface 176 to adjust, the current received by the solenoid 130, providing an alert of a possible system fault via the interface 176, automatically shutting down, or prompting an operator via the interface 176 to shut down, the system 10, etc.

Feedback from the magnetometer 172 and/or the inductance sensor 175 can be continuous or repeated at predefined intervals or at predefined times (e.g., each time a command input of different value is received) during operation of the system 10 to provide effectively real-time diagnostics, monitoring and, when needed, corrective action.

Figure 3:
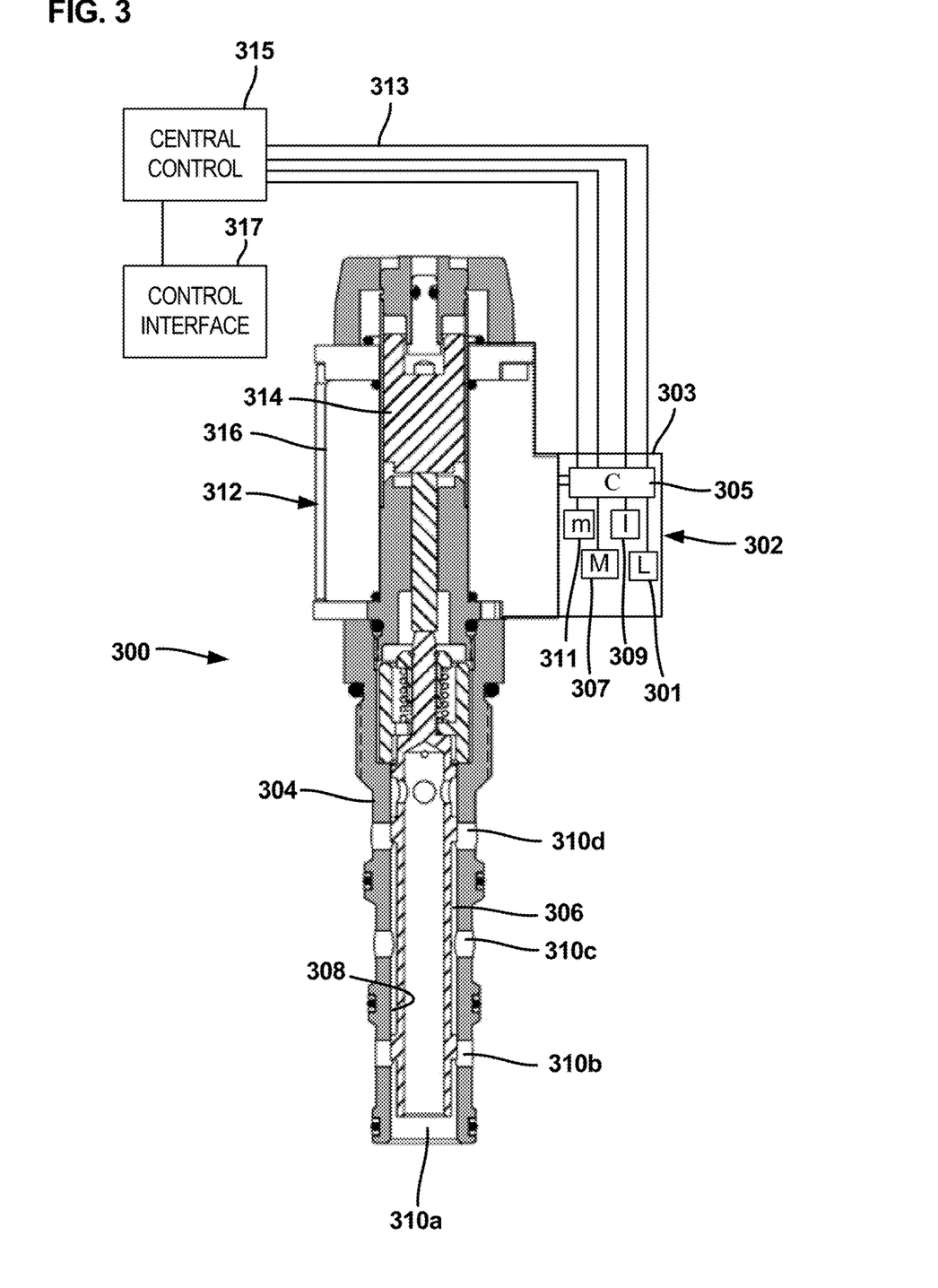
FIG. 3 depicts a proportional valve equipped with a control module in accordance with the principles of the present disclosure.

FIG. 3 depicts one example implementation of a valve assembly 100 in the form of a proportional spool valve 300 equipped with an electronic control unit 302 in accordance with the principles of the present disclosure. The valve 300 includes a valve body 304 adapted to be installed (e.g., threaded) in the port of a valve block (e.g., a valve manifold). A spool 306 is mounted to move axially within a spool bore 308 defined by the valve body 304. By axially moving the spool 306 between different axial positions within the spool bore 308, fluid communication can be selectively opened and closed between various ports 310a-310d defined by the valve body 304. The valve 300 includes a solenoid 312 for controlling axial movement of the spool 306. The solenoid 312 includes an armature 314 positioned within a solenoid coil 316. The armature 314 moves axially a distance which is in proportion to a magnitude of electrical current passed through the solenoid coil 316. Thus, the position of the armature 314 can be changed by varying the electrical current passed through the solenoid coil 316. The armature 314 is operatively coupled to the spool 306 such that the spool 306 moves axially with the armature 314. The valve flow passage size defined between ports and thus the flow rate though the valve between the port varies with the position of the spool 306, which is controlled by the magnitude of the electrical current directed through the solenoid coil 316.

The control unit 302 electrically connects to the solenoid coil 316 (e.g., via a 2-contact electrical connector) and is adapted to direct electrical current to the coil 316 to control operation of the valve 300. The control unit 302 is capable of varying the magnitude of the electrical current provided to the coil 316 in response to control commands input to the central controller 315 by the operator through the control interface 317.

The electronic control unit 302 includes a module housing 303 containing structure such as a magnetometer 307 (e.g., a three axis magnetometer) and an electrical current meter 309 operatively coupled thereto. In certain implementations, the electronic control unit 302 also includes an inductance sensor 301. The control unit 302 mounts at a location in which the magnetometer 307 can magnetic flux of the solenoid coils 316. For example, the control unit 302 can mount to the solenoid 312 (e.g., to the solenoid housing) or elsewhere such as on the valve manifold (e.g., valve block). In one example, the control unit 302 is mechanically and electrically connected to the solenoid coil 316 by an electrical connector such as a two contact (e.g., 2-pin) connector that is received within a socket corresponding to the solenoid coil 316. Due to a fixed mechanical coupling of the solenoid 312 to the module housing 303, there is a fixed or substantially fixed distance between the magnetometer 307 and the coil or coils 316 of the solenoid 312.

In certain implementations, the electronic control unit 302 includes electronic circuitry that couples the sensors 301, 307, 309 to one or more control processors and memory that can be accessed by the one or more control processors. In the example shown, a control processor 305 and memory 311 are disposed within the module housing 303 to directly control the sensors 301, 307, 309. In certain implementations, the electronic control unit 302 can be integrated as part of a system which implements a communication protocol (e.g., a Controller Area Network bus (CAN bus)) for coordinating operation of a plurality of the electronic control units 302. The control unit 302 can be electrically connected by electrical wiring 313 (e.g., which may include an electrical harness) to a central controller 315. In this way, electrical power and supervisory control can be provided to the control unit 302. A control interface 317 (e.g., a joystick, dial, toggle, or other device for allowing an operator to input control commands to the central controller 315) connects to the central controller 315. Alternatively, the sensors 301, 307, 309 can be directly controlled by the central controller 315.

The control processor 305 and/or the central controller 315 can be adapted to execute computer-readable instructions (e.g., instructions stored on the memory 311) which allow the electronic control unit 302 to monitor the magnetic flux feedback from the magnetometer 307, or magnetic flux feedback from the magnetometer 307 and the inductance feedback from the inductance sensor 301 and to send the measured values to the central controller 315. The control processor 305 and/or central controller 315 also can be adapted to measure electrical current in the coil or coils 316 of the solenoid 312 and to send the measured values to the central controller 315.

Figure 4:
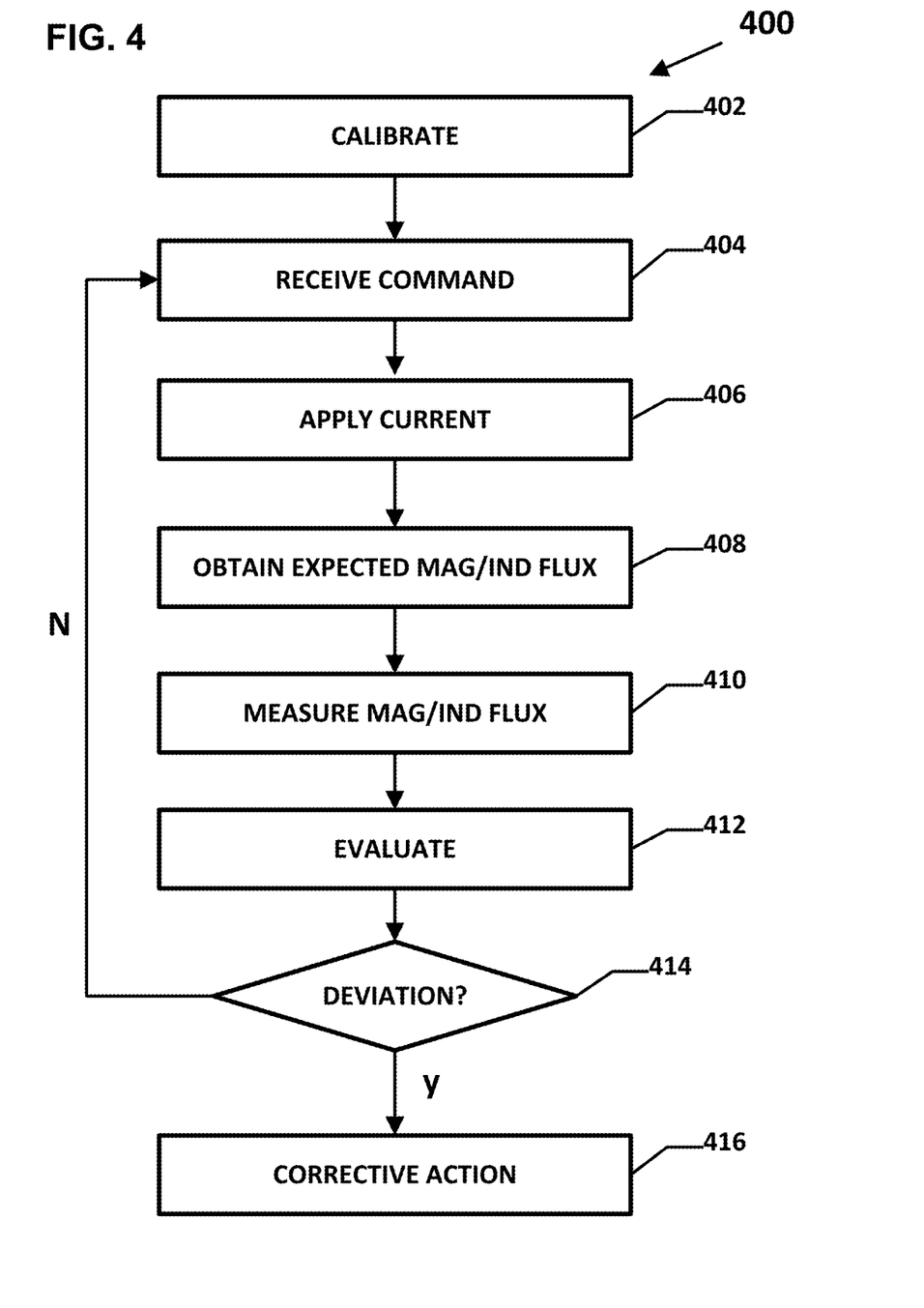
FIG. 4 is a flowchart showing an operational sequence for determining whether a position of a spool deviates from an expected position.

FIG. 4 is a flowchart showing an example operating sequence 400 for a system including the valve assembly 300 and control unit 302. The operating sequence 400 begins at a calibration step 402 in which electric current values are mapped to magnetic flux values for a given valve spool 306 and solenoid 312. In certain examples, these mapped values are stored in a database (e.g., the look-up table 200 of FIG. 2). For example, a corresponding magnetic flux value is measured for each or a portion of the electric current values applied to the solenoid 312 during calibration.

An instruction to move the spool 306 is received from the user at a receive command step 404. For example, the instruction may be provided by the user via the control interface 317. In certain examples, the instruction indicates a direction in which to move the spool 306. In certain examples, the instruction indicates either a distance to move the spool 306 or a position to which the spool 306 is to be moved. The control processor 305 and/or the central controller 315 determines an amount of current needed to be applied to the solenoid 312 to move the spool 306 in accordance with the received instruction. The control unit 302 applies the determined amount of current to the solenoid 312 at an apply step 406.

At an obtain step 408, the control processor 305 and/or the central controller 315 accesses memory (e.g., memory 311) to obtain an expected magnetic flux feedback for the determined current value applied to the solenoid 312. In certain implementations, the control processor 305 and/or the central controller 315 accesses a look-up table, such as look-up table 200 of FIG. 2, to obtain the magnetic flux value that was mapped to the value of the determined amount of current. In certain implementations of the obtain step 408, the control processor 305 and/or the central controller 315 accesses memory (e.g., memory 311) to also obtain an expected induction flux feedback for the determined current value. In certain implementations, the control processor 305 and/or the central controller 315 accesses a look-up table, such as look-up table 200 of FIG. 2, to obtain the induction flux value that was mapped to the value of the determined current value.

The control processor 305 and/or the central controller 315 monitors magnetic flux feedback obtained from the magnetometer 307 during movement or at the end of movement of the spool 306 at a measure step 410. In certain implementations, the control processor 305 and/or the central controller 315 monitors induction flux feedback obtained from the inductance sensor 301 during movement or at the end of movement of the spool 306 at the measure step 408.

The expected magnetic flux value and the measured magnetic flux value are compared at an evaluate step 412 to determine if the values match or match within a predetermined tolerance. If the values match or match within the predetermined tolerance, than the operational sequence branches at module 414 back to the receive command 404. If the values do not match or do not match within the predetermined tolerance, than the operational sequence branches at module 414 to a corrective action step 416. Mismatched values indicate that the position of the spool 306 has deviated from expectations.

In some examples, the corrective action step 416 logs an error message for the system. In some examples, the corrective action step 416 issues an alert (e.g., to the user interface 317) indicating a possible system fault. In some examples, the corrective action step 416 prompts an operator to adjust the current being applied to the solenoid 312. In some examples, the corrective action step 416 automatically adjusts the current being applied to the solenoid 312. In some examples, the corrective action step 416 automatically shuts down the valve assembly 300 or overall system. In some examples, the corrective action step 416 prompts a user (e.g., via the user interface 317) to shut down the valve assembly 300 or overall system.

Figure 5:
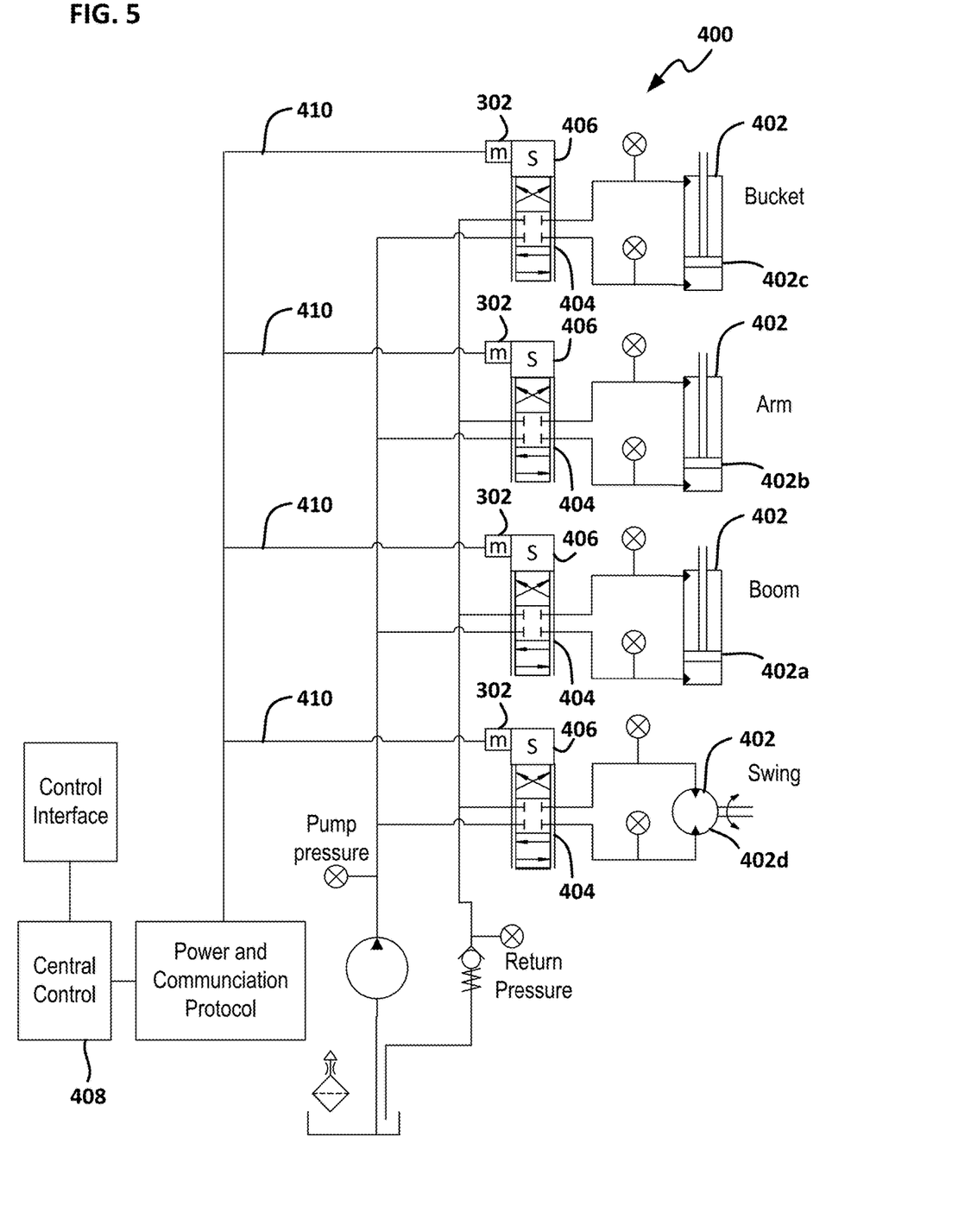
FIG. 5 is a schematic depiction of a hydraulic system for powering hydraulic actuators of an excavator.

FIG. 5 shows a hydraulic system 400 for an excavator which incorporates control units 302 in accordance with the principles of the present disclosure. The hydraulic system 400 includes hydraulic actuators 402 (e.g., hydraulic cylinders, hydraulic motors, etc.) distributed throughout the system. The actuators include hydraulic cylinders 402a-c for controlling movement of the boom, arm and bucket of the excavator, and a hydraulic motor 402d for controlling rotation of the excavator cab relative to the tracks. The hydraulic actuators 402 are controlled by valves 404 which are controlled by solenoids 406. The control units 302 are each assigned to a given one of the solenoids 406 and thus are distributed throughout the system to provide a distributed control system. The control units 302 are shown mounted to each solenoid 406, but could also be mounted to the valve blocks or elsewhere in relative close proximity to their assigned solenoid. A communication protocol (e.g., Ethernet, CAN bus) can be used as part of a network (e.g., with wired and optionally wireless communication capabilities) to coordinate operation of the control units 302 through a central control 408. Wiring can be used to provide power to the control units 302 and solenoids 406 and to allow for communication between the various electronic components of the system. The wiring can include wiring harnesses 410 that branch from a central cable or cables.

Figure 6:
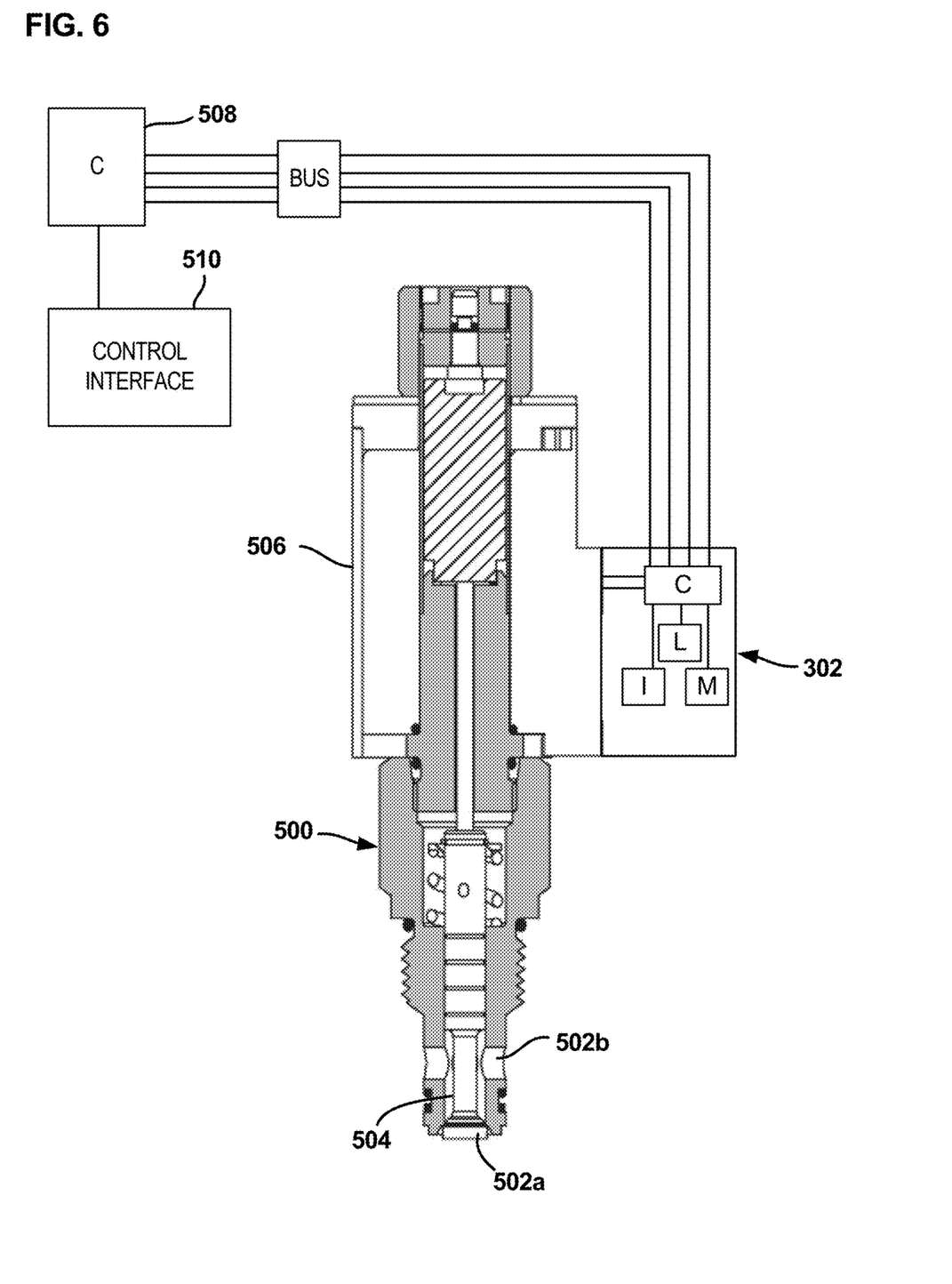
FIG. 6 depicts another proportional valve equipped with a control module in accordance with the principles of the present disclosure.

FIG. 6 shows one of the control units 302 coupled to a poppet-style proportional valve 500 which controls hydraulic fluid flow between first and second ports 502a, 502b. A poppet 504 of the valve 500 is moved by a solenoid 506. The control unit 302 controls the electrical current provided to the solenoid 506 and senses the magnetic flux feedback during movement or at the end of movement of the poppet 504. In certain examples, the control unit 302 also senses the inductance flux feedback during movement or at the end of movement of the poppet 504. The control unit 302 or the central controller 508 looks up or otherwise obtains the magnetic flux and/or inductance flux values that would be expected for the electrical current provided to the solenoid 506. A comparison between the sensed values and the expected values can be used in the same manner described above to determine whether corrective action is needed. The control unit 302 interfaces with a central controller 508 and controls the current provided to the solenoid 506 based on operator commands received from a control interface 510.

Example Aspects of the Disclosure

Aspect 1. A valve assembly comprising:
a regulating member mounted within a bore of a valve housing, the regulating member being moveable between a plurality of open positions where fluid flow is permitted through a port of the valve housing and a closed position where fluid flow is blocked through the port;
a solenoid linear actuator adapted to linearly drive the regulating member between the closed position and the plurality of open positions; and
a magnetometer, the magnetometer being adapted to measure a magnetic flux through at least a portion of the solenoid linear actuator, wherein a magnetic flux value measured by the magnetometer corresponds to a linear position of the regulating member relative to the port.

Aspect 2. The valve assembly of aspect 1, wherein the regulating member is one of a flow regulating member or a pressure regulating member.

Aspect 3. The valve assembly of any preceding aspect, further comprising a current meter that measures electrical current in the solenoid linear actuator, wherein values of electrical current in the solenoid linear actuator measured by the current meter are mapped to expected magnetic flux values measured by the magnetometer.

Aspect 4. The valve assembly of aspect 3, wherein the electrical current values are also mapped to expected inductance values in the solenoid linear actuator.

Aspect 5. The valve assembly of any of aspects 1-2, wherein a look-up table is generated and stored in a memory, the look-up table mapping each of a plurality of electrical current values in the solenoid linear actuator to a corresponding expected magnetic flux value or a corresponding magnetic flux-inductance pair value, where the magnetic flux value or magnetic-flux-inductance pair value corresponds to a unique linear position of the regulating member relative to the port.

Aspect 6. The valve assembly of aspect 5, wherein, for a given current value supplied to the solenoid, the magnetic flux or magnetic flux-inductance pair is measured and used as feedback that is compared to the stored expected magnetic flux value or the expected magnetic flux-inductance pair value corresponding to the given current value to determine whether to perform a corrective action.

Aspect 7. The valve assembly of aspect 6, wherein the corrective action includes adjusting electrical current in the solenoid.

Aspect 8. The valve assembly of aspect 7, wherein the corrective action includes shutting off a system that includes the valve assembly.

Aspect 9. The valve assembly of any preceding aspect, wherein the fluid that flows through the port when the regulating member is in one of the open positions is a liquid or a gas.

Aspect 10. The valve assembly of any preceding aspect, wherein the regulating member is a spool or a poppet.

Aspect 11. The valve assembly of any preceding aspect, wherein the regulating member is a land of a spool.

Aspect 12. The valve assembly of any preceding aspect, wherein the magnetometer is an integrated component of a control unit that controls metered flow through the port.

Aspect 13. The valve assembly of any preceding aspect, wherein the magnetometer is adapted to measure a magnetic flux vector relative to each of three mutually perpendicular axes in space.

Aspect 14. The valve assembly of aspect 12, wherein the control unit includes a printed circuit board to which are operatively coupled the magnetometer, a gyroscope, and an accelerometer.

Aspect 15. The valve assembly of any preceding aspect, wherein the magnetometer is not positioned in a flow passage of the valve assembly or of a system that includes the valve assembly.

Aspect 16. The valve assembly of aspect 12, the control unit is not positioned in a flow passage of the valve assembly or of a system that includes the valve assembly, and/or wherein the control unit is not exposed to hydraulic pressure.

Aspect 17. A method of detecting a deviation from an expected position of a regulating member of a valve assembly in a mechanical system, comprising:

for a first electrical current value received by a solenoid of the valve assembly that drives linear movement of the regulating member, measuring, with a magnetometer, a first magnetic flux value through the solenoid;

comparing the first magnetic flux value to a predetermined expected magnetic flux value corresponding to the first electrical current value; and, based on the comparing, determining if there is a deviation from the expected position of the regulating member.

Aspect 18. The method of aspect 17, further comprising, for the first electrical current value received by the solenoid, measuring a first inductance value in the solenoid; and comparing the first inductance value to a predetermined expected inductance value corresponding to the first electrical current value, wherein the determining if there is a deviation is also based on the comparing the first inductance value to the predetermined expected inductance value.

Aspect 19. The method of aspect 17 or 18, further comprising adjusting the current received by the solenoid until the expected magnetic flux value is measured by the magnetometer.

Aspect 20. The method of aspect 18 or 19, further comprising adjusting the current received by the solenoid until the expected inductance value is measured.

Aspect 21. The method of any of aspects 17-20, wherein the expected magnetic flux value is one of a plurality of expected magnetic flux values, and the first electrical current value is one of a plurality of electrical current values, wherein the method further comprises generating a look-up table that maps each of the electrical current values to one of the expected magnetic flux values.

Aspect 22. The method of aspect 21, wherein the expected inductance value is one of a plurality of expected inductance values, wherein the generating a look-up table comprises mapping each of the electrical current values to one of the expected magnetic flux values and one of the expected inductance values.

Aspect 23. The method of any of aspects 17-23, wherein the fluid is a liquid.

Aspect 24. The method of any of aspects 17-23, wherein the fluid is a gas.

Aspect 25. The method of any of aspects 17-24, wherein the regulating member is a metering land of a spool.

Aspect 26. The method of any of aspects 17-25, wherein the magnetometer is an integrated component of a control unit that controls metered flow through the port.

Aspect 27. The method of any of aspects 17-26, wherein the magnetometer is adapted to measure a magnetic flux vector relative to each of three mutually perpendicular axes in space.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A valve assembly comprising:
a valve housing;
a regulating member mounted within a bore of the valve housing, the regulating member being moveable between a plurality of open positions where fluid flow is permitted through a port of the valve housing and a closed position where fluid flow is blocked through the port;
a solenoid linear actuator including a solenoid coil, the solenoid linear actuator adapted to linearly drive the regulating member between the closed position and the plurality of open positions;
an electronic control unit electrically connected to a central controller, the electronic control unit including a module housing containing a printed circuit board (PCB);
a connector electrically connected to the electronic control unit;
a magnetometer operatively coupled to the PCB, the magnetometer being adapted to measure a magnetic flux through at least a portion of the solenoid linear actuator,
wherein a magnetic flux value measured by the magnetometer corresponds to a linear position of the regulating member relative to the port;
wherein the valve assembly includes an inductance sensor adapted to measure inductance in the solenoid coil;
wherein the electronic control unit includes a current meter that measures electrical current in the solenoid linear actuator, wherein measured electrical current values measured by the current meter in the solenoid linear actuator are mapped to expected magnetic flux values measured by the magnetometer and expected inductance values sensed by the inductance sensor;
wherein the module housing is mechanically connected to the solenoid linear actuator, the module housing being positioned a fixed distance from the solenoid coil such that the magnetometer can sense magnetic flux values of the solenoid coil; and
wherein the central controller is adapted to execute computer-readable instructions which allow the electronic control unit to monitor changes to the magnetic flux values of the solenoid coil or changes to the electrical current in the solenoid coil.

2. The valve assembly of claim 1, wherein the regulating member is one of a flow regulating member or a pressure regulating member.

3. The valve assembly of claim 1, wherein a look-up table is generated and stored in a memory, the look-up table mapping each of a plurality of electrical current values in the solenoid linear actuator to a corresponding expected magnetic flux value or a corresponding magnetic flux-inductance pair value, where the magnetic flux value or magnetic-flux-inductance pair value corresponds to a unique linear position of the regulating member relative to the port.

4. The valve assembly of claim 3, wherein, for a given current value supplied to the solenoid, the magnetic flux or magnetic flux-inductance pair is measured and used as feedback that is compared to the stored expected magnetic flux value or the expected magnetic flux-inductance pair value corresponding to the given current value to determine whether to perform a corrective action.

5. The valve assembly of claim 4, wherein the corrective action includes adjusting electrical current in the solenoid.

6. The valve assembly of claim 5, wherein the corrective action includes shutting off a system that includes the valve assembly.

7. The valve assembly of claim 1, wherein fluid that flows through the port when the regulating member is in one of the open positions is a liquid or a gas.

8. The valve assembly of claim 1, wherein the regulating member is a spool or a poppet.

9. The valve assembly of claim 1, wherein the regulating member is a land of a spool.

10. The valve assembly of claim 1, wherein the magnetometer is adapted to measure a magnetic flux vector relative to each of three mutually perpendicular axes in space.

11. The valve assembly of claim 1, wherein the electronic control unit is not positioned in a flow passage of the valve assembly or of a system that includes the valve assembly.

12. A method of determining if there is a deviation from an expected position of a regulating member of a valve assembly in a mechanical system, comprising:
   for a first electrical current value received by a solenoid of the valve assembly that drives linear movement of the regulating member, measuring, with a magnetometer, a first magnetic flux value through the solenoid;
   comparing the first magnetic flux value to a predetermined expected magnetic flux value corresponding to the first electrical current value;
   for the first electrical current value received by the solenoid, measuring a first inductance value in the solenoid;
   comparing the first inductance value to a predetermined expected inductance value corresponding to the first electrical current value; and,
   based on the comparing the first magnetic flux value to the predetermined expected magnetic flux value and based on the comparing the first inductance value to the predetermined expected inductance value, determining if there is a deviation from the expected position of the regulating member.

13. The method of claim 12, further comprising adjusting an electrical current received by the solenoid until the predetermined expected magnetic flux value is measured by the magnetometer.

14. The method of claim 12, further comprising adjusting the electrical current received by the solenoid until the predetermined expected inductance value is measured.

15. The method of claim 12, wherein the predetermined expected magnetic flux value is one of a plurality of expected magnetic flux values, and the first electrical current value is one of a plurality of electrical current values, wherein the method further comprises generating a look-up table that maps each of the electrical current values to one of the expected magnetic flux values.

16. The method of claim 15, wherein the predetermined expected inductance value is one of a plurality of expected inductance values, wherein the generating a look-up table comprises mapping each of the electrical current values to one of the expected magnetic flux values and one of the expected inductance values.

17. The method of claim 12, wherein the regulating member of the valve assembly regulates flow of a liquid.

18. The method of claim 12, wherein the regulating member of the valve assembly regulates flow of a gas.

19. The method of claim 12, wherein the regulating member is a metering land of a spool.

20. The method of claim 12, wherein the magnetometer is an integrated component of a control unit that controls metered flow through a port defined by a valve housing of the valve assembly.

21. The method of claim 12, wherein the magnetometer is adapted to measure a magnetic flux vector relative to each of three mutually perpendicular axes in space.

* * * * *